Aug. 4, 1931.  C. W. GREEN  1,817,815
CASH REGISTER
Filed Aug. 25, 1924   6 Sheets-Sheet 1

Inventor
CHARLES. W. GREEN.

By
A. A. Hickpany
H. C. Diesem
Attorneys

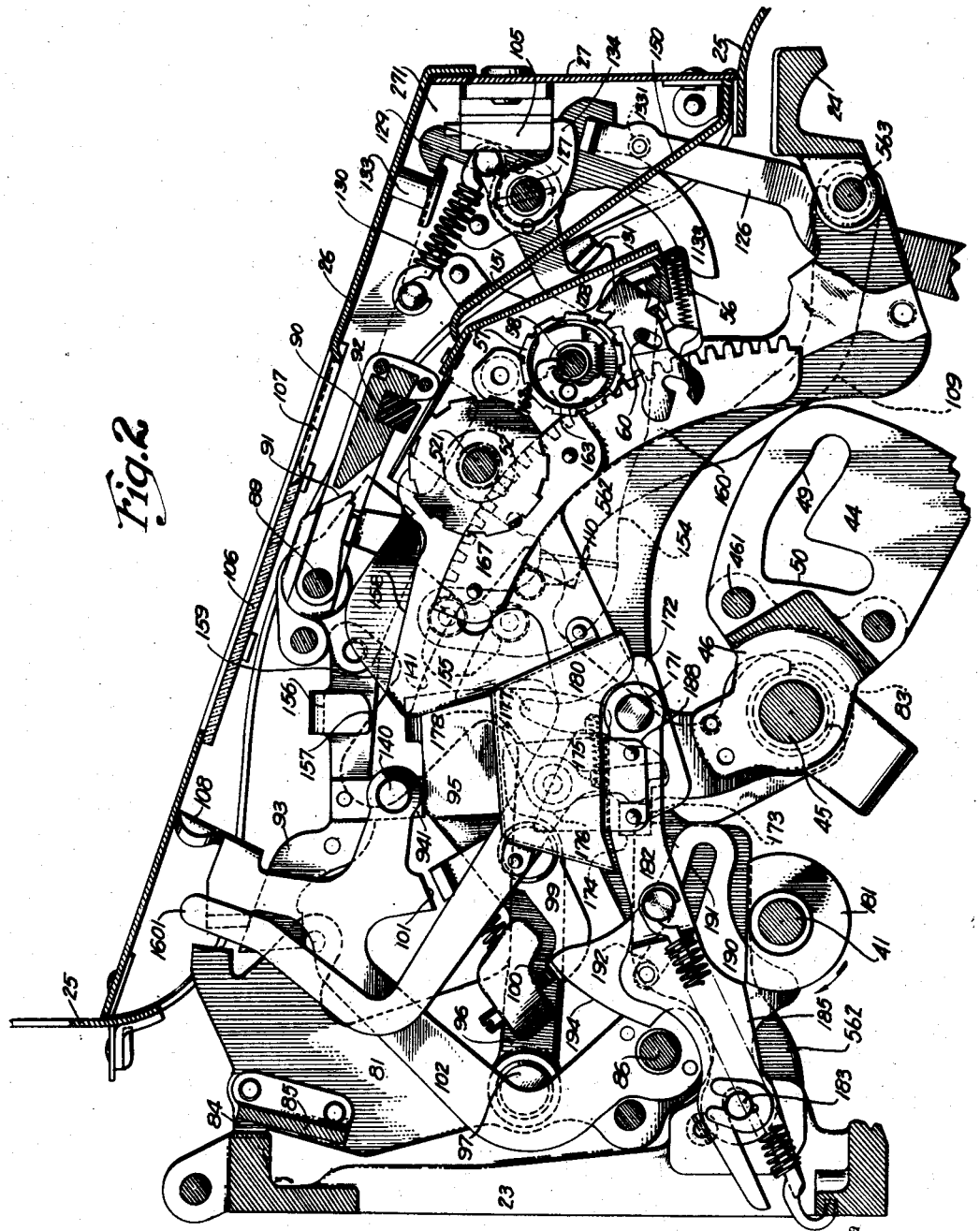

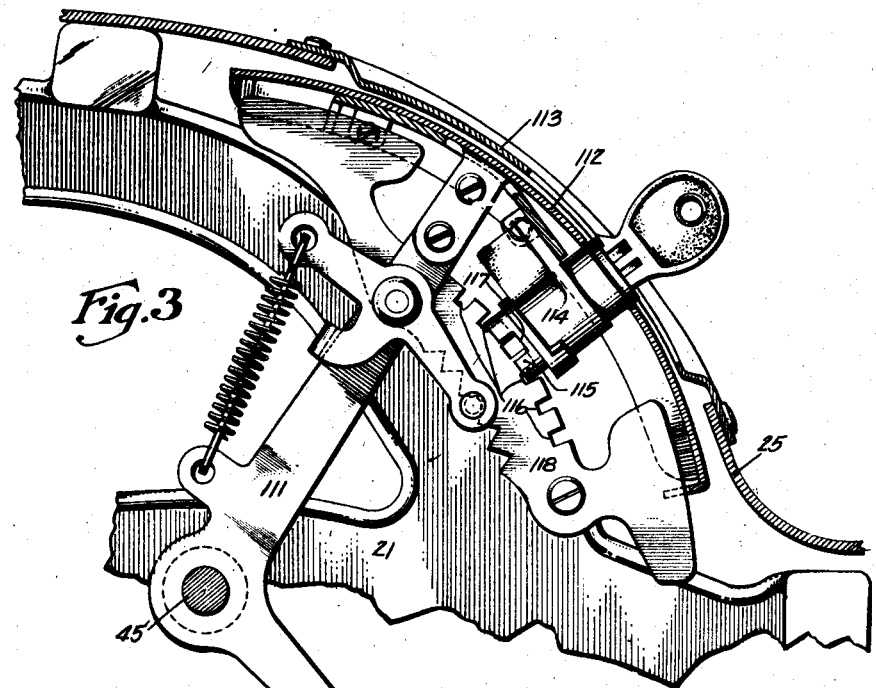
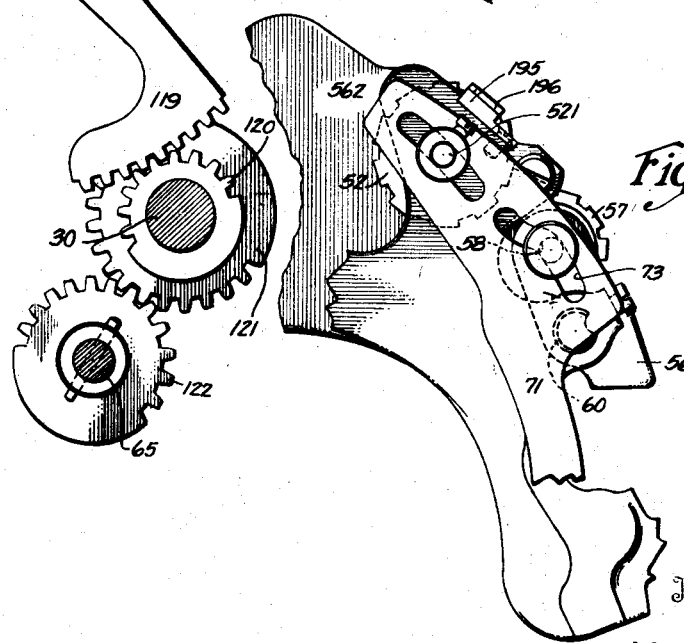

Aug. 4, 1931.   C. W. GREEN   1,817,815
CASH REGISTER
Filed Aug. 25, 1924   6 Sheets-Sheet 4
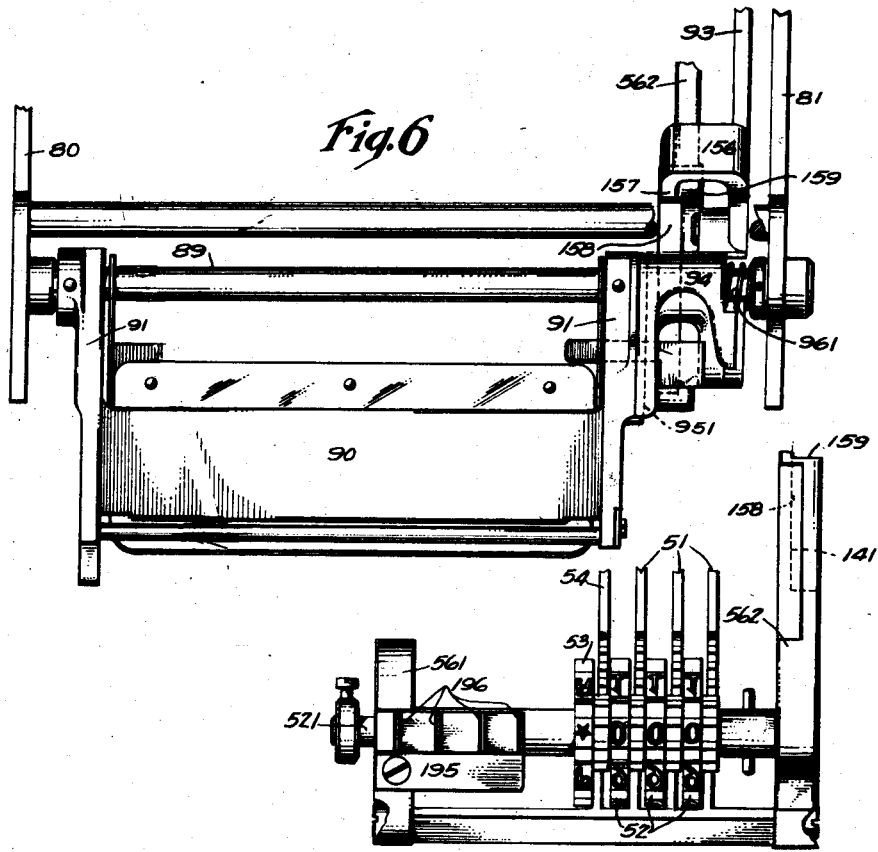
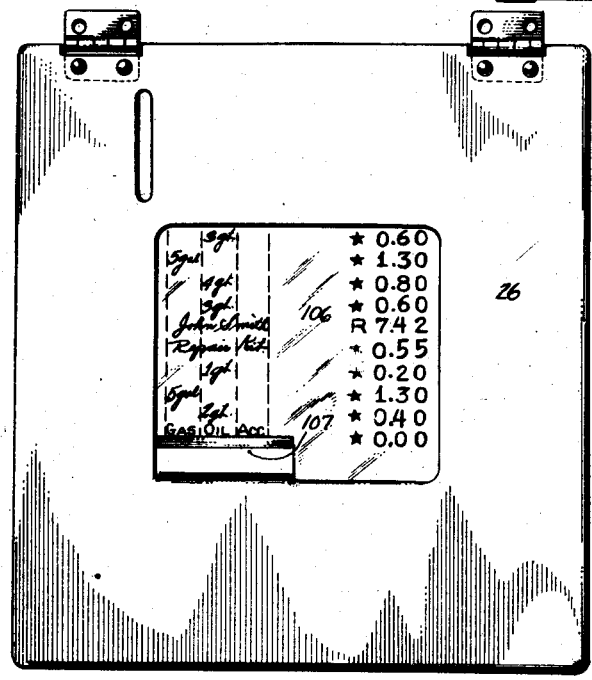
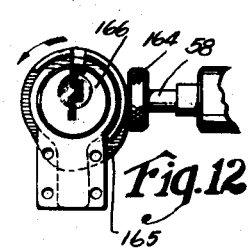
Inventor
CHARLES. W. GREEN.
Attorneys Aug. 4, 1931.  C. W. GREEN  1,817,815
CASH REGISTER
Filed Aug. 25, 1924   6 Sheets-Sheet 5

Inventor
CHARLES. W. GREEN.

By
Attorneys

Aug. 4, 1931.  C. W. GREEN  1,817,815
CASH REGISTER
Filed Aug. 25, 1924   6 Sheets-Sheet 6
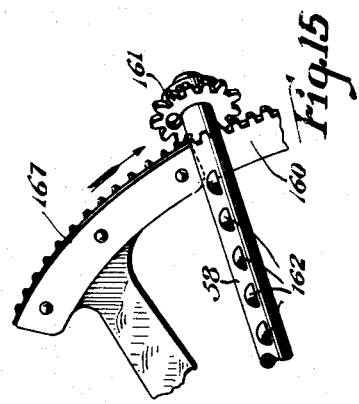
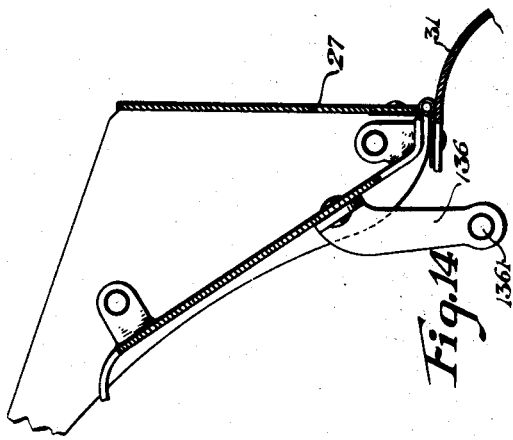
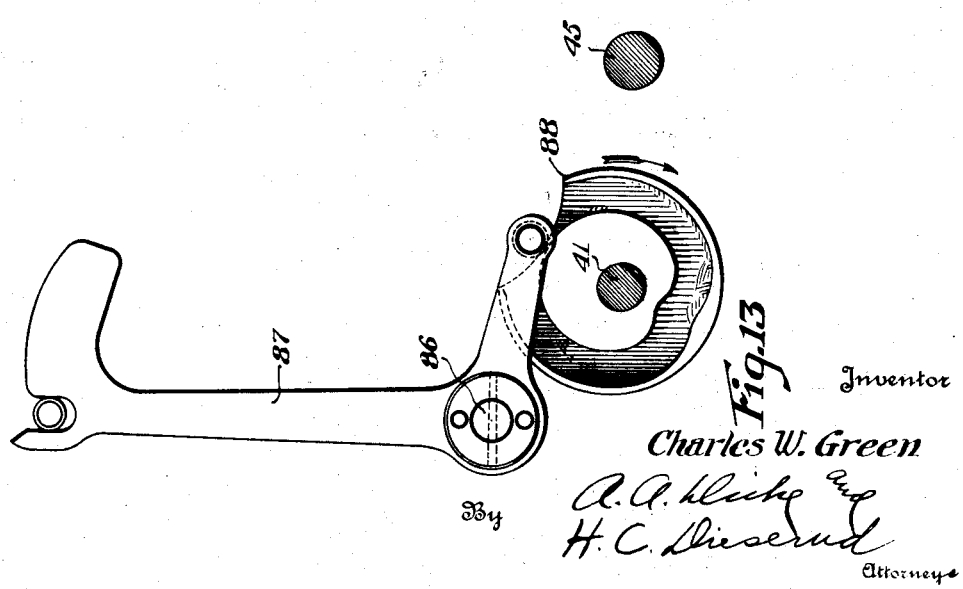
Inventor
Charles W. Green
By
Attorneys Patented Aug. 4, 1931

1,817,815

UNITED STATES PATENT OFFICE

CHARLES W. GREEN, OF ILION, NEW YORK, ASSIGNOR TO REMINGTON ARMS COMPANY, INC., A CORPORATION OF DELAWARE

CASH REGISTER

Application filed August 25, 1924. Serial No. 733,999.

This invention relates to cash registers and accounting machines generally and more particularly to that class employing printing devices for printing the accumulated items and totals.

One object of the present invention is to provide a printing totalizer adapted to print the total of a series of items upon a record strip associated with related devices so as to insure the correct printing of the total.

The present register has been designed particularly for use in chain stores, department stores of the like where the supervision of a number of registers is controlled by some person generally known as the auditor. The printing of the total is placed under the control of the manager of the chain store or a department head in a department store while periodically the auditor resets the totalizer for the next accumulation of the items comprising a subsequent period of business. Where totals are printed daily and the totalizer reset at less frequent intervals the total printed will be a "running" total and the differences between the successively printed daily totals will be the total for the sales of the corresponding day.

In some registers on the market it is possible for a dishonest employee to manually rotate the totalizer elements backwardly any desired amount and produce an erroneous record of the total.

To preclude this possibility the present register has a shield or guard securely fastened to the printer frame so that access to the total printing elements cannot be obtained even though the lids of the register are open as when the machine is conditioned for a total printing operation. To insure proper operation of the total printing devices and the resetting devices interlocking devices are also provided as well as means adapted to enforce a complete operation of the resetting means when once begun.

Another object of the present invention is to prevent raising of the platen when the printing frame is displaced from its normal position and to prevent operation of the total taking device when the platen is out of its normal position.

Still another object of the present invention is to provide interlocking devices between the operating keys, total taking means, and resetting devices so that the proper operation of any of these devices will be insured and any irregular operations which would result in the printing of an incorrect total are prevented.

Another object of the present invention is to provide a special type block for printing lines and the like upon the record strip. The printing of these lines will serve to rule the paper strip into columns in which can conveniently be entered quantities of goods sold or any other desired notation through a suitable autographic opening.

With these and incidental objects in view the invention consists in certain novel features of construction and combination of parts, the essential elements of which are set forth in the appended claims, and a preferred form of embodiment of which is hereinafter described with reference to the drawings which accompany and form part of the specification.

Of said drawings:

Fig. 2 is a transverse sectional view taken substantially through the center of the machine showing among other features the lid locking mechanism, the resetting devices and certain of the interlocking devices for insuring a correct operation of the manipulative devices.

Fig. 3 is a transverse sectional view showing the general control lever and the lock for holding it in its variously adjusted positions.

Fig. 4 is a partial top plan view showing the item type printing wheels and the special type block for ruling upon the record strip.

Fig. 5 is partial view in side elevation showing the type wheels, the pivoted totalizer and the cam plate for engaging the totalizer elements with the differential mechanism.

Fig. 6 is a partial top plan view of the printer showing the platen frame, the clutch for connecting it to the actuating member and the locking devices for preventing operation of the total taking devices when the platen is raised, as well as preventing the raising of the platen when total printing is being effected.

Fig. 7 is a view showing the resetting device and the full stroke enforcing mechanism as well as the interlocking devices associated with the operating keys and the total printing mechanism.

Fig. 8 is a sectional view taken through the totalizer showing one of the total printing wheels, its associated resetting pawl and the shaft for zeroizing the totalizer elements.

Fig. 11 is a top plan view of the autographic lid showing a number of printed items and the manner in which the special ruling block rules the record strip to permit the entries of desired notations in the proper columns.

Fig. 12 is a face view of the special lock controlling the resetting device, the lock being shown apart from the totalizer guard or shield to which it is secured.

Fig. 13 is a detail of the printer operating cam and lever.

Fig. 14 is a detail sectional view of the front lid with its depending arm.

Fig. 15 is a perspective view of a portion of the resetting mechanism.

Figure 1:
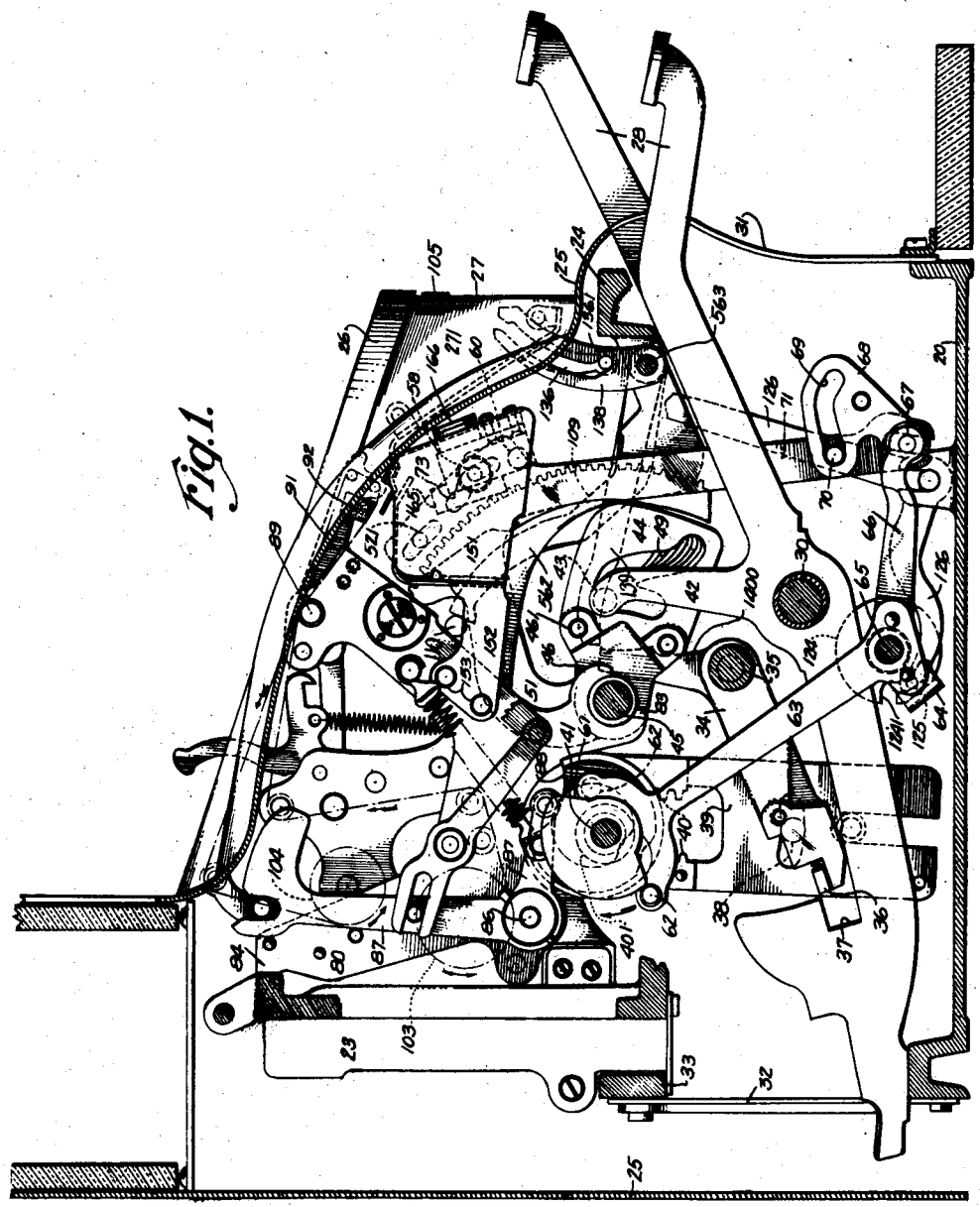
Fig. 1 is a sectional view of the cash register taken near the left end of the machine showing some of the keys, a portion of the printing devices, the differential mechanism for driving the totalizer elements as well as the totalizer engaging mechanism.

Reference to the detailed description which follows and which is divided under suitable headings will give a full understanding of the various features embodied in the present invention and their intended mode of operation.

For the purpose of illustration this invention has been shown as applied to a type of machine the general principle of which is disclosed in the U. S. applications S. N. 263,125 filed Nov. 19, 1918 and S. N. 283,720 filed March 20, 1919 by Frederick L. Fuller, and in the British Patents 135,465; 140,363; 157,-823; 157,824 and 157,825 of July 11, 1921, but it is to be understood that this invention is not limited to this type of machine, but may with slight modification be applied to other well known forms of accounting machines. The U. S. applications referred to have matured into Patent 1,742,701, January 7, 1930, and Patent 1,729,338, September 24, 1929 respectively.

Framework

The various parts of the mechanism are supported by a suitable framework comprising a base casting 20 and suitable side frames, one of which is shown in Fig. 3 and indicated by reference character 21. The main side frames are connected at their upper rear ends by a frame work 23 and cross connections in the form of tie bars 24 and 33, situated toward the front and rear of the machine, respectively. The present machine is also provided with two intermediate and parallel supporting frames 561 and 562 shown in Figs. 2 and 4. The mechanism is enclosed by a cabinet 25 preferably formed of one piece and of any suitable material. The cabinet 25 has hinged thereto a flat lid 26 and a front cover 27 for providing access to the printing mechanism for replenishing the paper supply printing totals, and resetting the totalizer.

Keys and operating mechanism

The illustrative machine is provided with a number of groups of amount keys, several of these keys being shown in Fig. 1 and indicated by reference characters 28.

The amount keys 28 are pivoted upon a shaft 30 extending transversely of the machine and journaled between the side frames 21. The keys are guided in their reciprocating movements by slots 31 formed in the front part of the cabinet 25 and are further guided at their rearward ends by a vertically slotted plate 32 attached to the tie bar 33. Resting upon the rear ends of the keys is a key coupler 34 journalled at 35 between the side frames. The key coupler has a nose 36 co-operating at times with notches 37 formed in the rear ends of the keys 28. When the outer ends of the keys are depressed the key coupler 34 is rocked clockwise (as viewed in Fig. 1) and the nose 36 thereon enters the notches 37 formed in the rear ends of the keys. The purpose of such key coupler mechanisms is well known in the art and need not be discussed herein.

Connected to the key coupler at 38 is a vertical reciprocating rack plate 39 provided with oppositely facing rack teeth 40 which alternately mesh with a gear 401 fast to a main operating shaft 41 journaled between the machine side frames. The arrangement of this mechanism is such that a reciprocation of the key coupler 24 by the keys will effect a complete rotation of the gear and the shaft 41 to which the gear is secured. Shaft 41 is provided with cams or other suitable devices for operating various parts of the registering and printing mechanisms.

Some suitable form of full stroke mechanism, to compel a complete operation of the machine when once started, may be provided, but since mechanism for this purpose is fully disclosed in the Fuller application previously mentioned, it need not be described here.

Differential mechanism

The differential mechanisms or devices controlled by the various groups of keys for adjusting the item type carriers and actuating the different totalizers are all similar in construction and principle and a description of one will suffice for all. As shown in Fig. 1 each of the amount keys 28 is provided with an upwardly extending arm 42 carrying a suitable anti-friction roller 43 co-operating with differential slots formed in cam plates 44. Loosely mounted upon a transverse shaft 45 is a frame 46 provided with spaced slots in which are secured by pins 461 a series of cam plates 44, one for each key. The cam plates 44 are provided with "L" shaped slots 49 and 50, the slot 50 being concentric with respect to the shaft 45. The slots 49 are, however, graduated so that when the rollers 43 carried by the arm 42 of a depressed key operates in the slot 49 of its associated cam plate 44 it will move the frame 46 differentially and to an amount commensurate with the value of the key depressed. When, however, the frame 46 is operated by the depression of a key 28 of a certain group the rollers 43 of the undepressed keys of the same group will play in the arcuate slots 50 of their respective cam plates 44, thereby permitting the frame 46 to be raised differentially without interfering with the rollers 43 of the unoperated keys.

It is to be understood that there is a differential frame for each group of amount keys. As is shown in Fig. 1 the differential frame 46 has attached thereto a segmental rack 51. In continuous mesh with the teeth of the segmental rack 51 is a pinion attached to an item type wheel 52 mounted upon a shaft 521 and adapted to print upon a record strip. From the above it will be evident that since there may be nine keys in a particular group and a corresponding number of cam plates 44, the segmental rack 51 and type carrier 52 may be brought to any one of nine different positions by depression of a key 28 associated with such group of keys. In a manner similar to this the keys associated with any of the denominational groups will adjust their related type carriers so that when printing is effected the type wheel will print the character corresponding to the value of the keys depressed.

As best shown in Fig. 4 the illustrative machine is provided with three segmental racks 51 for adjusting the amount item type carriers 52. There is also shown a special type carrier 53 for indicating the type of transaction entered in the machine. This type carrier is normally in a position to print a character indicating a cash transaction, but may be movable to other positions under the control of special keys for indicating other types of transactions, such as, "Received on account", and "Paid out". For adjusting this type carrier 53 differentially there is provided a segment 54 (Fig. 4) which is operated by a differential frame controlled by a series of transaction keys. The present drawings do not show any transaction keys, but it is understood that there are a series of transaction keys which operate in a manner similar to that which has been described in connection with the amount keys so that the character of any special registration or transaction may be recorded in connection with the amount. For further details of construction and operation of the mechanism associated with the transaction keys reference may be had to the Fuller application Ser. No. 263,125 hereinbefore mentioned.

Totalizer and engaging mechanism

Situated below the type carriers 52 and 53 is a pivotally mounted totalizer 56. The totalizer 56, as shown in detail in the Fuller application and generally in Fig. 5, is pivotally mounted between the side frames 561 and 562 and comprises a frame journalled as at 60 and having mounted therein a shaft 58 supporting a series of wheels 57, the peripheries of which (Fig. 8) are formed with raised characters so as to effect printing upon a suitable impression material. In order to bring the totalizer pinions secured to the totalizer wheels into mesh with the actuating racks 51 at the desired time the totalizer frame is adapted to be rocked about the pivotal studs 60 as a center. For engaging the totalizer with the segmental racks 51 any suitable means may be employed, but as herein disclosed there is provided a pair of complimentary cams 61 (Fig. 1) the peripheries of which are adapted to co-operate with rollers 62 carried by a lever 63 secured to a bail 64 loosely pivoted upon a shaft 65 near the base of the machine. The bail 64 has attached thereto at substantially the mid-portion of the machine a lever 66 which has pivotally mounted at its extreme end by a pin 67, a cam plate 68 provided with a cam slot 69 engaging a pin 70 carried by the lower end of a totalizer control slide 71.

The totalizer control slide 71 for the purpose of guiding it in its movement may be bifurcated at its lower end to engage the pin 67 while the upper end of the control slide may also be bifurcated or provided with a cam slot to engage the shaft 521 which supports the item type carriers. The totalizer control slide 71 has furthermore a cam slot 73 (Fig.

5) engaging the totalizer element supporting shaft 58.

From the above it will be clear that when the machine is operated the complimentary cams 61 will rock the lever 63 clockwise and through the medium of the bail 64 and arm 66 will force the cam plate 68, pin 70 and control slide 71 downwardly, thereby bringing the totalizer pinions into mesh with the actuating racks due to the action of the cam slot 73 on the totalizer shaft 58. During the downward depression of the keys the totalizer pinions will remain in mesh with the actuating racks, being actuated an amount corresponding to the value of the key depressed. Upon the completion of the downward stroke of the keys or the beginning of the upward stroke, if desired, the control slide 71 may be raised upwardly by the mechanism just described due to the formation of cams 61 and the totalizers will be thrown out of mesh with the actuators and retained in that position during the upward stroke of the keys.

Record strip printing mechanism

It is desirable each time an item is entered in the machine that this amount be printed upon the record strip within the machine cabinet. The record strip provides a complete record of all the transactions entered in the machine and at the end of a particular period may be detached from the machine and sent away to the head office to be checked and filed away for future reference.

The printing mechanism for printing the items and totals accumulated by the totalizer comprises a pivoted printing frame formed of two side frames 80 and 81 (Figs. 1 and 2) the lower ends of which are provided with claws 83 overlying the shaft 45. Normally the printing mechanism rests by its own weight in the position shown in Figs. 1 and 2 with lugs 84 contacting with a portion of the frame 23. The frames 80 and 81 are connected together by a cross member 85 as shown in Fig. 2 and shafts and other members which will be referred to hereinafter. In its normal position the printer frame is adapted to print from the item type 52 upon the record strip the items entered in the machine, but it may be rocked downwardly under the control of a manipulative device to print the total upon the record strip from the totalizer wheels 57.

Journalled in the printer side frames 80 and 81 is a shaft 86, the extreme left end of which has fastened to it a bell-crank 87 carrying a roller which co-acts with the race of a box cam 88 fast to the shaft 41. As has been mentioned hereinbefore the shaft 41 is given a complete rotation during each operation of the machine and the rotation of the box cam will rock the shaft 86 to actuate a platen and to feed the record strip.

Extending transversely of the printer side frames 80 and 81 and journalled therein is a platen supporting shaft 89 (Fig. 6) upon which is supported the platen 90 by means of forwardly extending arms 91 (Fig. 6) secured to the shaft 89. The under face of the platen 90 is provided with a rubber impression block 92 clearly shown in Figs. 1 and 2.

Extending rearwardly from and movable with the right arm 91 is a platen actuating arm 93 provided with a lug 941 (Fig. 2) which is actuated by a hammer 95 to force the platen 90 against the type to take an impression. The platen 90 is not directly connected with the platen actuating arm 93, but is connected to it by a clutch member 94 (Fig. 6). The clutch member 94 is loosely mounted on the shaft 89 and is adapted to connect or disconnect the arm 93 and is provided with a groove 951 which is adapted to engage with a rib formed on one side of the platen arm 91. A spring 961 surrounds the shaft 89 and is interposed between a collar fast to the said shaft and the clutch and tends to force the groove 951 into its normal or locking position with respect to the rib on the platen arm 91. To disconnect the platen 90 from the actuating arms so that the platen may be lifted upwardly in order to obtain access to the item type wheels, or the usual inking ribbon below the platen, or for any other reason, all that is necessary is to manually slide the clutch 94 to the right as viewed in Fig. 6 to disengage the groove from the locking rib and lift the platen frame upwardly. This mechanism is briefly explained herein and for further details as to construction and operation reference may be had to the application of Raymond E. Rice, Ser. No. 584,722, filed Aug. 28, 1922, now Patent No. 1,554,761, granted September 22, 1925.

For actuating the platen actuating arm 93 of the platen 90 there is provided a hammer 95 (Fig. 2) which is formed as part of an arm 96 pivoted to the inside right printer side frame 81 by a stud 97. The hammer 95 is forced upwardly by a spring bearing against a lug carried by the right printer frame 81, neither of which are shown in the present drawings, but which are similar to the spring 66 and lug 67 shown in Fig. 3 of the Rice patent above mentioned. The arm 95 is furthermore provided with a spring-pressed retracting pawl 99 having a tail bearing against an adjustable stop 100 on the arm 96. The pawl 99 has a lug co-operating with a nose 101 formed as part of an arm 102 secured to the main printer shaft 86.

When the arm 102 is rocked clockwise by means of the cam 88, bell-crank 87, and shaft 86 (Fig. 1) to which the bell-crank is secured the nose 101 on the arm 102 will bear against the lug of the pawl 99 and retract the hammer against the tension of the spring. Upon further movement of the arm 102 the nose will clear the lug of the pawl 99 and permit the hammer portion 95 to strike the lug 941 of the platen arm 93 and through the clutch 94 will rock the platen 90 downwardly to effect a printing impression from the adjusted type carriers.

The record strip upon which are printed the items and totals is shown diagrammatically in Fig. 1 the paper extending from the supply roll 103 around suitable guide rolls, around the platen 90, around other guide rolls and finally back to the storage roll 104. The details of the record strip as well as the means for advancing it during the operation of the machine are fully set forth in the before-mentioned Fuller application, Ser. No. 263,125 as well as the British Patent 157,824 and, therefore, need not be described here.

The machine is further equipped with an inking ribbon and a ribbon feeding mechanism which are not shown in the drawings since these do not comprise any part of the present invention. One form which this mechanism might take is clearly shown and described in the Fuller application Ser. No. 263,125 and the corresponding British patent mentioned to which reference may be had for further details of construction and operation. It is sufficient here to state that the inking ribbon passes between the record strip below the platen block 92 and the type wheels 52.

The lids 26 and 27 which are hinged to the cabinet are provided to cover and conceal the record strip printing mechanism and the printing totalizer. The lid 26 is locked by a lock 105 attached to the cover 27 and the key of this lock is usually retained by the clerk operating the machine so that he can raise the lid 26 to obtain access to the paper holding mechanism in order to replenish the supply of paper when it is exhausted. The locking means for the lid 26 will be more fully explained hereinafter in another section. Under this lid are the resetting and total printing manipulative devices, but both of these are locked or inoperative as far as their functions are concerned so that these devices cannot be operated by the clerk or unauthorized persons.

Secured to the under side of the flat lid 26 there is a glass 106 (Figs. 2 and 11) to permit the visibility of a number of items which have previously been entered in the machine. The glass is cut away at 107 to permit written entries to be made in juxtaposition to the printed items in a manner shown in Fig. 11.

*Printing a total*

To take a total from the totalizer all that is necessary is to swing the printer frame downwardly until the platen is directly over the totalizer and when in this position it will automatically be actuated and the total standing on the totalizer printed upon the record strip.

To rock the printer frame downwardly there is provided a manipulative device 108 (Fig. 2) formed as part of the lever 102 which is pivoted to the shaft 86. As shown in Fig. 2 the manipulative device 108 is located under the lid 26 and since the clerks operating the machine have possession of the keys to the lock controlling the release of this lid there is provided an additional lock for preventing unauthorized persons from operating the manipulative device 108 to take a total from the totalizer. This lock comprises a rearwardly extending arm 109 (Fig. 2) fast to a shaft 563 which is journalled in ears integral with the cross member 24. The extreme end of the arm 109 contacts with a pin 110 secured to the printer side frame 81. The disabling of this lock to permit rocking of the printer frame to take a total is under control of a key lock, the key of which is retained by the proprietor. The mechanism for disabling this lock as well as the device for unlocking both lids will now be described.

Loosely pivoted upon the segment shaft 45 (Fig. 3) is a control lever 111 having secured thereto a concentric plate 112 slidable beneath the cabinet 25 of the machine. The plate carries a pointer which is not shown in the drawings, but is slidable in a slot formed in a second concentric plate 113 attached to the machine cabinet. The plate 113 may be suitably provided with designations opposite which some index member carried by the control lever 111 may be brought to indicate the nature of the control exerted by the latter at any particular time. As more fully explained in the Fuller application Ser. No. 263,125, as well as the British Patent 157,823 hereinbefore referred to, the control lever may be adjustable to any of four or more positions in one of which it predetermines an "open drawer" operation, i. e., one in which the machine may be operated regardless of whether the drawer is open or closed. In another position of the lever a "closed drawer" operation may be compelled, that is, one in which the machine may be operated only when the drawer is closed. In still another position the register may be completely locked against operation while in a fourth position the machine may be conditioned for resetting and total printing. Only that mechanism which is appurtenant to the last mentioned condition of the machine will be described, as the other devices form no part of the present invention and need not be described herein in detail. For further information relative to the other devices reference may be had to the Fuller application Ser. No. 263,125 and the British Patent 157,823 which set forth the details of construction and operation.

Attached to the plate 112 by any desirable means is a suitable lock such as a plunger lock 114 which projects through the plate 113 and has at its lower end a flange 115 to engage suitable notches 116 in a plate 118 attached to the right side frame 21. The flange 115 is provided with a slot 117 which is adapted to be brought in the plane of the plate 118 by rotation of the barrel of the lock.

To adjust the control lever to the "total and reset" position all that is necessary is to insert the key in the lock and rotate the barrel to bring the notches 117 into the plane of the plate 118 and then move the key and the parts movable therewith so that the index points to the desired designation on the plate 113. The key is then given a ninety degree turn in the reverse direction so that the flange 115 will co-operate with the desired notches 116. Removal of the key will now lock the control lever in its set position.

The lever 111 is provided with a gear sector 119 meshing with the gear sector 120 fast to the key shaft 30. Also secured to this shaft is a somewhat larger gear sector 121 meshing with another gear sector 122 rigidly secured to a transverse shaft 65 previously mentioned which carries a disk 124 (Fig. 1) formed with a cam slot 1241 co-operating with a stud 125 carried by the rearward arm of a bell-crank 126.

As best shown in Fig. 2 the front lid 27 is hinged at its lower end to the cabinet 25 and suitably journalled between the side plates 271 of the lid by means of a shaft 127 to which they are secured are two locking arms 128 and 129 drawn counter-clockwise by a spring 130 which is attached to a rearward extension of the arm 128. The locking arm 128 engages a lug 131 attached to a portion of the cabinet 25 while the locking arm 129 is adapted to engage a flange on a stud 133 attached to the under side of the flat lid 26. As is evident from Fig. 2 the hook portion of the locking arm 129 is somewhat shorter than the hook of the locking arm 128 so that when the shaft 127 is rocked by the bolt of the lock 105 as previously suggested, contacting with an arm 134 attached to the shaft 127, the locking arm 129 will be moved sufficiently to disengage it from the stud 133 to release the upper lid, while the hook of arm 128 still engages the lug 131 to prevent opening of the lower lid.

In order to rock the shaft 127 to release both lids when the control lever is shifted to the "total and reset" position the locking arm 128 has integral therewith a downwardly extending projection 1133 normally contacting with a pin 1331 carried by the upper arm of the bell-crank 126. When the index is set to the "total and reset" position the shaft 65 will be partially rotated by the connections previously described to rock the bell-crank 126 counter-clockwise thereby causing the pin 1331 to rotate the shaft 127 sufficiently to unlock both lids.

As is best shown in Fig. 1 the lid 27 has attached thereto an arm 136 carrying a pin 1361 co-operating with a cam slot formed in a plate 138 secured to the shaft 563. During the time the lower lid 27 is opened outwardly the stud on the arm 136 will force the cam plate 138 rearwardly rocking the shaft 563 counter-clockwise (Figs. 1 and 2) and thereby permitting the locking arm 109 to pass downwardly out of the path of the stud 110 carried by the printer frame. Also secured to the shaft 563 there is a rearwardly extending arm 139 which is normally above the projection 1400 secured at one end to the key coupler 34. During a normal operation of the keys the projection 1400 will pass underneath the arm 139, but when the front cover is opened the locking arm 139 will be rocked downwardly in front of the projection 1400 to prevent any oscillation of the key coupler and thereby preventing any operation of the keys. From the above it will be observed that when the front cover is opened the keys will be locked against depression and the printer frame will be unlocked thereby permitting the proprietor to obtain a total from the totalizer in a manner which will now be described.

The manipulative device 108 has secured thereto a stud 140 which co-operates with a groove 141, (Fig. 2) formed in the right hand supporting frame 562 which it will be recalled, serves as a support for the totalizer and item printing wheels.

When the proprietor desires to take a total from the totalizer the manipulative device 108 is grasped and by drawing it forward and first rocking the arm 102 slightly about the shaft 86 until the shoulder 101 strikes the lug on the upper arm of the pawl 99 and then rocking the printer frame about the shaft 45 the stud 140 will enter the groove 141 and continued movement of the printer frame will cause a clockwise rotation of the shaft 86 to the same extent that the box cam 88 rocks it during a regular operation of the machine, as more fully explained in the previously mentioned Fuller application 263,125 and British Patent 157,824.

The cam groove 141 is so proportioned and curved that it will cause the release of the printing hammer 95 at substantially the time that the platen 92 overlies the totalizer printing elements. The end of the groove 141 serves to positively stop the forward movement of the printer frame when it is in its proper position to print a total from the totalizer. Whenever the total is printed the record strip will be fed an increment in a manner described in detail in the Fuller application, Ser. No. 263,125 and the British Patent last mentioned.

Locking devices

The total printed upon the record strip indicates the amount of the cash in the drawer and which the proprietor is accountable for. In the usual cash register rotating the totalizer elements backwardly through the improper use of some instrument the proprietor can change the total to any amount desired thereby making him accountable for less cash than was actually taken in. To prevent defrauding the company by this way, the present register is provided with a totalizer shield which effectively prevents any improper access to the totalizer elements for the purpose of manipulation. In addition to the above preventative means the present register has a number of locking devices so that irregular operations are prevented and the proper operation of the manipulative devices is insured. The manner in which this is brought about will now be described in detail.

To prevent access to the totalizer elements when the upper lid is opened there is provided a shield 150 (Fig. 2) extending between the two side plates of the cover 27. In addition to this there is provided a metal shield or cover 151 having a side plate 152 (Fig. 1) riveted at 153 to the left printer side frame 80 and a side plate 154 (Fig. 2) riveted at 155 to the right printer side frame 81. The side plates 152 and 154 are outside of the supporting frames 56 so that there will be no interference with the same when the printer frame is rocked downwardly. The various places through which it would otherwise be possible to insert an instrument to rotate the totalizer wheels are covered by suitably bending the shield and attaching additional guards at the proper places. As is best shown in Fig. 2 the lower end of the guard is quite close against the lower portion of the totalizer frame, but separated from it a distance sufficient to permit a free rocking movement of the totalizer at the desired times.

As stated hereinbefore the printer frame, together with the special shield, is rocked downwardly to print a total and since the platen can be lifted upwardly by means of the clutch connections previously described it would naturally be possible to lift the platen up when it is positioned over the totalizer and thereby obtain improper access to the wheels. For this reason a suitable locking device is provided which, when the printer frame is in normal position (Fig. 2) permits the raising of the platen, and when the latter is raised, locks the printer frame against movement. This same locking mechanism prevents raising of the platen when the printer frame has been rocked downwardly away from its normal position so as to print a total.

This device is best shown in Figs. 2, 4 and 6 wherein it will be seen that the platen actuating arm 93 has integral therewith a hook 156, the locking edge 157 normally co-operating with a milled cut 158 in the supporting frame 562 which is substantially half the thickness of the frame. When it is desired to lift the platen by moving the clutch to the right the platen actuating arm 93 to which it is attached will also be moved to the right thereby bringing the locking edge 157 in the plane of the portion of the frame 562 indicated by reference character 159.

If it is attempted to move the printer frame downwardly it will be prevented by the edge 157 abutting against the edge 159. When the platen is in its lowermost or normal position and the printer frame rocked the locking edge 157 will co-operate with the side of the milled cut 158 thereby preventing the lifting movement of the platen since as will be observed it will be impossible to move the clutch member 94 to the right as viewed in Fig. 5 to release the platen for lifting it.

From the above it will be evident that by these important provisions the totalizer is prevented from manipulation even if the cabinet is removed from the machine and it will be impossible to turn the wheels except by the ordinary operation of the machine which will show up on the record strip, or by the resetting devices, which are under the control of a special lock as explained in the following section.

Resetting devices and associated locking devices

After the amounts of sales for a day or other regular intervals have been entered in the machine and the total thereof printed upon the record sheet it is usually desirable to reset the totalizer so as to accumulate the sales occurring during a subsequent period. The means for accomplishing this is best shown in Figs. 2 and 8 where it will be seen that a resetting segment 160 is loosely pivoted upon the shaft 45 and provided with teeth to engage the teeth of a pinion 161 (Fig. 7) attached to the right end of the totalizer wheel supporting shaft 58. The totalizer supporting shaft is provided with resetting notches 162 and the totalizer wheels with resetting pawls 163 having an end engageable with the notches in the shaft 58. Normally the engaging ends of the pawls are out of engagement with the notches in the shaft but when the shaft 58 is shifted longitudinally (as viewed in Fig. 8) the pawls will engage with the notches 162 of the shaft 58 and when the resetting segment is operated the gear 161 will rotate the shaft 58 so that the notches will engage and pick up the variously positioned pawls and rotate the associated totalizer wheels to their zero positions.

Normally the gear 161 is out of mesh with the segment 160 but is shifted to the engaged position by means of a separate lock attached to the guard 151. As shown in Fig. 2 the resetting segment has an operating lever 1601 which is under the lid 26 and while the clerk has access to it and can operate it, it is inoperative as far as its resetting function is concerned.

As is shown in Fig. 12 the shaft 58 is provided with a knob 164 which is adapted to cooperate with a cam element 165 secured to the rotatable barrel of the resetting lock 166 riveted to the guard 151. It will be clear that when the key is inserted in the lock and the cam 165 rotated the shaft 58 will be shifted to bring the pawls in engagement with the notches in the shaft. To prevent the shaft 58 from being shifted when the resetting segment has been partially operated the segment 160 is provided with a plate 167 (Fig. 2) which, as will be clear, will get into the path of the teeth of pinion 161 when the segment is moved from its normal position. It will also be clear that the plate 167 bearing against the side of the pinion 161 will, after it has been shifted, tend to hold it in this position during the complete stroke of the resetting segment. The cam member 165 when actuating the plunger 164, operates against the tension of a spring member, not shown, which tends to maintain the shaft 58 in its normal position.

The provision of a separate lock to operate the resetting shaft permits the use of separate keys for the control lever lock and the resetting device. In some store systems it may be desirable to have an auditor to reset the totalizer, only the total printing being under control of the manager of the store. In other systems it may be desirable to permit the manager to reset the totalizer periodically but to insure that the resetting operation is always complete and in order that there will be no chance for irregular operations of any of these parts a number of locking devices are provided for additional precaution.

Figure 9:
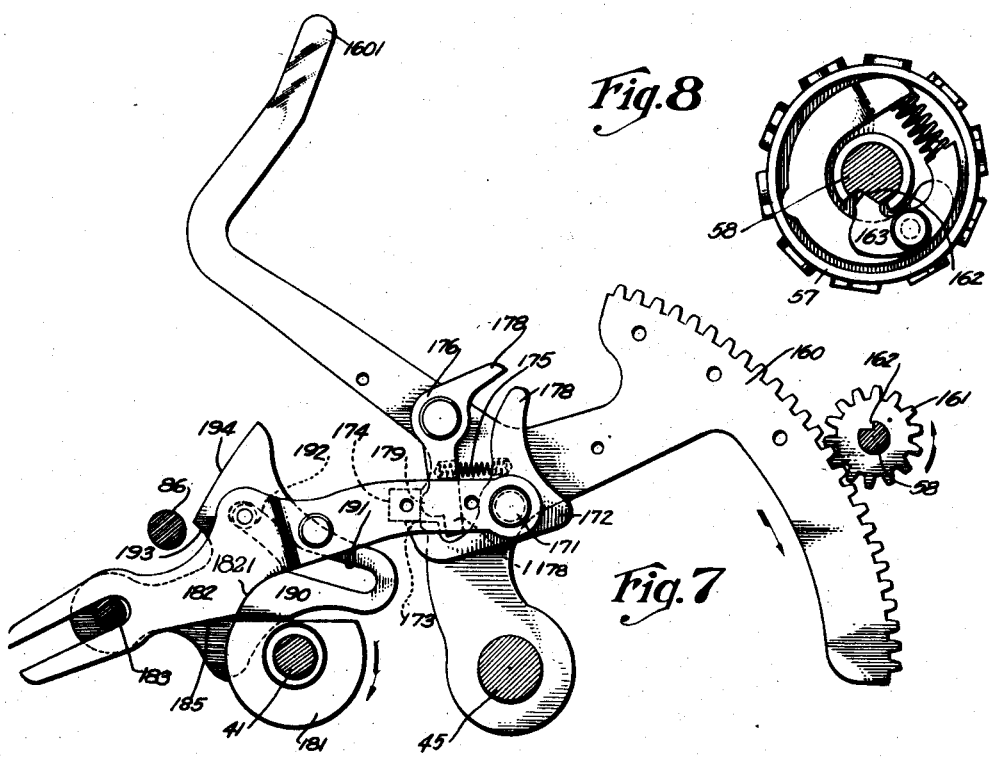
Figs. 9 and 10 are detail views showing parts of the full stroke enforcing device in the positions they assume during different stages of the operating stroke of the resetting lever.
Figure 10:
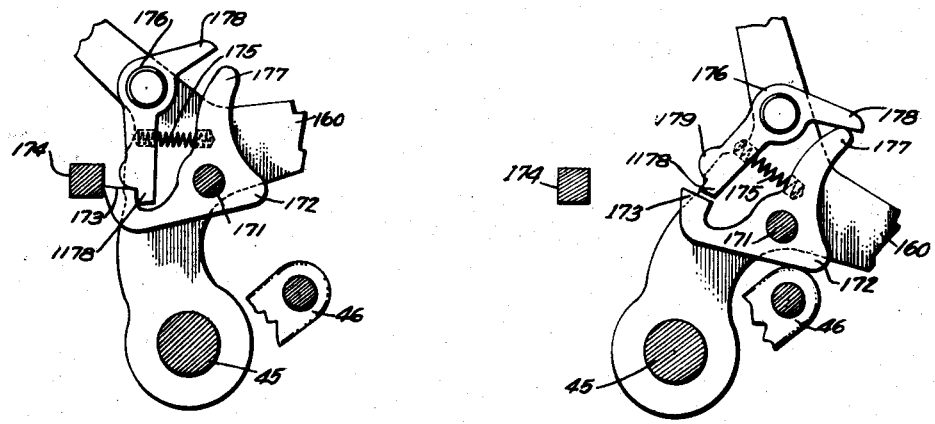

In order to insure a complete operation of the resetting segment when once begun there is pivoted to the segment 160 at 171 a locking pawl 172 which normally (Fig. 7) has a locking edge 173 bearing against a square lug 174 integral with the right frame 562. A spring 175 interposed between the locking pawl 172 and a holding pawl 176 also pivoted upon the segment 160 tends to rotate the pawl 172 clockwise. When the resetting segment 160 is drawn downwardly the locking edge 173 leaves the lug 174 the parts now assuming the position shown in Fig. 9. It will, therefore, be impossible to return the resetting segment after an initial movement except by completing the forward movement first. As the resetting segment is moved still further the pawl 172 will strike a stationary member which happens to be, in the machine herein disclosed, a portion of the differential frame 46, Figs. 2 and 10, associated with the dimes bank of keys which at this time is always in its normal position. This will tend to rock the pawl 172 counter-clockwise and through the action of spring 175 the pawl 176 will rock clockwise until the upper end 178 of the holding pawl 176 engages the end 177 of pawl 172 as shown in Fig. 10. When the segment is moved rearwardly the holding pawl 176 will hold the pawl 172 in its shifted position against the action of spring 175. This is accomplished by means of the end 1178 contacting with the end 173 of pawl 172 and is so designed that the end 173 will clear the lug 174 when the segment is brought to its normal position. However, at the extreme rearward movement of the segment 160 the vertical forward edge of the lug 174 will contact with a projection 179 of the pawl 176 and cause it to be rocked about its pivot to thereby disengage the ends 173 and 1178. The parts will now again assume the position shown in Fig. 7. To prevent improper manual access to the full stroke enforcing device there is provided a shield 180 (Fig. 2) enclosing the operating parts. The shield is riveted to the segment and is of box formation so as to prevent the insertion of an instrument to manipulate any of the parts.

It is very desirable to lock the operating keys during an operation of the resetting segment because if no means were provided to prevent the operation of the keys it would be possible to unlock the keys by bringing the arm 139 above the projection 1400 of the key coupler merely through the closing of the front lid 27. Previous to this operation the resetting segment might have been operated and held with the wheels partially reset. In addition to producing an erroneous reading on the totalizer it will be evident under these conditions that since the resetting segment would be in mesh with the pinion carried by the totalizer frame at the same time that the operation of the machine attempted to cause engagement of the totalizer with the actuators one side of the totalizer frame would be moved rearwardly by the totalizer engaging plate as the latter was operated. This would place an undesirable strain upon the totalizer frame and by applying a force to the totalizer engaging device the totalizer pinions might possibly be thrown into engagement with the operating segments. If this should be the case then by rocking of the actuator frames through depressing the keys the totalizer wheels would be rotated and due to the interference of the resetting pawls carried by the wheels with the notches in the shifted shaft some strain would likewise be placed upon these parts.

To prevent misoperation of this character the resetting lever and operating shaft 41 are provided with coacting means for preventing operation of the keys if the resetting handle is shifted from its normal or home position, and which will on the other hand, prevent movement of the resetting segment if a key has been partially depressed and the shaft therefore given a partial rotation. In the present embodiment this coacting means consists of disk 181 adapted to co-operate with a member 182 which is pivoted to the segment 160 by the stud 171 and is bifurcated at its rear end to straddle a stub shaft 183 attached to the inside of the right frame 562. When the shaft is in its normal position, the position in which it is shown in Figs. 2 and 7, the resetting lever is free to be operated, but when it is moved from its normal position a locking edge 185 of the member 182 will coact with a portion of the disk 181 thereby preventing rotation of the shaft 41 by the operating keys. It will also be apparent that when the shaft begins its rotation with the resetting lever at normal the periphery of the disk will be carried under a concentric edge 1821 (Fig. 7) of the member 182 thereby preventing any movement of the resetting lever until the rotation of the shaft is completed.

To more effectively prevent any manipulation of the full stroke enforcing device there is provided a plate or shield 188 (Fig. 2) riveted to the member 182 and, this, in combination with the shield 180 previously mentioned completely guards the mechanism during all portions of its movement.

While a full stroke mechanism has been provided for the resetting lever it would still be possible to operate the total taking and resetting devices simultaneously and thus print an incorrect total, if no preventative for this were provided. The total printed would be incorrect by an amount equivalent to that deducted from the totalizer by an actuation or partial movement of the resetting lever.

To this end there is provided a plate 190 (Fig. 7) pivoted upon the stud 183 and formed with a cam slot 191 engageable with a stud 192 carried by the member 182. The plate is formed with a hook 193 co-operating with the main operating printer shaft 86 and an edge 194 which is concentric with respect to the shaft 45 upon which the printer frame may be swung. From the above it will be observed that when the printer is rocked about its pivotal point 45 the shaft 86 (Fig. 7) carried by the printer will pass over the concentric edge 194 thereby locking the resetting lever 162. Actuation of the resetting lever will, through the pin 192 cooperating with the cam slot 191 rock the plate 190 upwardly thereby bringing the hook 193 over the printer shaft 86 and locking the printer against movement.

Due to the above described mechanism it will be impossible to take a total and perform resetting of the totalizer at the same time. Obviously the total should be printed before resetting, but after the totalizer has been reset the proof of this may be obtained by again rocking the printer to ascertain whether or not all the printing wheels are at zero.

The machine shown in the drawings is provided with a special type bar for printing lines upon the record strip simultaneously with each printing operation. This comprises a block 195 (Fig. 4) which is screwed to the upper portion of the frame 561 in line with the item printing type. The block 195 is provided with four line-printing elements 196 which are adapted to print four vertical lines upon the record strip (Fig. 11) with each item printing operation. In the columns which have been made by the ruling type block may be inserted any desired notation such as quantities of goods sold, etc. It is apparent that the printing block can be formed so as to print any number of lines, horizontal, diagonal or in any other way desired depending upon the requirements of a business. The glass 106, may, if desired, be marked by etching or otherwise to indicate the proper columns on the record strip for each particular class of goods.

It is necessary in some instances that the clerk be absent for a period of time and since he ordinarily has no key to the lock controlling the adjustment of the general control lever, the machine would be left in a condition free to be operated. During his absence there would be nothing to prevent any unauthorized persons from operating the register and abstracting the money or the contents in the cash drawer. To prevent this, registers are usually supplied with special drawer locks either attached to the cabinet or the cash drawer. It will be remembered that the autographic upper lid of the register is under a lock control, and the key of this lid is kept by the clerks for permitting them to open the lid and to obtain access to the printer mechanism for replenishing the paper supply. The machine lock which is operated by the resetting segment can therefore be conveniently used for the purpose of locking up the keys since prior to the departure of the clerk he can unlock the upper lid and move the resetting lever slightly forward where it will be held in this position to lock the operating keys and prevent access to his cash drawer. When he returns he can again unlock the lid and complete the stroke of the resetting lever. It will be recalled that the resetting lever is inoperative as far as its resetting function is concerned during this movement since the shaft 58 was not shifted and can only be shifted by an auditor or other authorized person.

*Summary of operation*

During the normal operation of the machine, to enter the amounts of the various sales made during the course of business, the appropriate keys 28 are depressed and rocked about the shaft 30. Pins or rollers 43, mounted in upward extensions 42 of the selected keys, will then co-operate with the appropriate cam slots 49 in the series of plates 44, to rock the segment frames differential extents, corresponding to the value of the keys depressed. Secured to the segment frames are the several operating rack segments 51, one of which is provided for each of the denominational groups of operating keys. Depression of any one or more keys, furthermore, serves to rock the key coupler 34 and, in so doing, to elevate the rack member 39, to cause a complete rotation of the main operating shaft 41 for each complete oscillation of the key coupler. By means of complementary cams 61 co-operating with rollers 62 on a rock lever 63, a totalizer control slide 71 is lowered through the arm 66 and plate 68, toward the beginning of an operation of the machine. As a result of this downward movement of the control slide 71 the cam slot 73 therein co-acts with the totalizer wheel supporting shaft 58 to rock the pinions into mesh with the actuating segments. After, substantially, the first half cycle of operation of the main shaft the slide 71 is again raised to disengage the totalizer pinions from the rack segments. Suitable transfer mechanism is provided, for the purpose of carrying into a higher order wheel upon each complete rotation of a lower order wheel.

For the purpose of recording the amounts entered, upon various operations of the machine, a box cam 88, mounted on the main shaft 41 co-operates with a bell crank lever 87, secured to a shaft 86. Also secured to the shaft 86 is an arm 102, provided with a cam surface 101, adapted to co-operate with an over-turned extension of a pawl 99, which is pivoted upon the arm 96 of the hammer 95. Continued movement of the arm 102 will serve to carry the surface 101 beyond the co-operating extension of pawl 99 and will thus release the hammer for a quick driving blow under the action of its spring. The blow of the hammer is transmitted to a lug 941, mounted on a platen operating arm 93, so as to cause a sharp downward movement of the platen 90, which is connected by means of a clutch member 94 with the platen operating arm 93. This downward movement of the platen serves to carry an impression block 92, around which suitable record material is passed, into engagement with the positioned type carried by a series of type wheels 52, which are constantly in mesh with the differential segments 51.

Suitable means are provided for feeding the record strip at the proper time and preferably for shifting the latter from a visible or autographic position down to the printing line and back into visible position. Similarly, suitable inking means is provided but since none of this mechanism constitutes any part of the novelty of this case, it is not shown nor described herein in any detail.

When, at the end of a day or other period of time, it is desired to determine the amount standing on the totalizer, a printing of this total upon the record strip may be effected through the operation of a total printing key 108. Normally, this key is inaccessible and is locked against movement. As best shown in Fig. 2, this key is formed as an extension of the arm 102, which is secured to the shaft 86, as previously mentioned; shaft 86, furthermore, is mounted in a printer frame which is composed of a pair of side plates 80 and 81, which are provided with forked extensions partially surrounding the shaft 45. As the key 108 is drawn forwardly it serves to produce a slight rocking movement of the arm 102 about the center 86, until the cam shoulder 101 strikes the upper end of pawl 99. At this time the arm 102 and shaft 86 will be moved bodily, due to the pivotal movement of the printer frame about the shaft 45. This movement will serve to carry a pin 140, mounted in a forward extension of the arm 102, into a cam slot 141, which is formed in a fixed intermediate plate within the machine. The formation of the cam slot 141 is such that upon the continued movement of the printer frame, the arm 102 and shaft 86 will be rocked relative to the frame in the same manner that they are rocked by means of the bell crank 87 and the box cam 88, mounted on the main shaft of the machine. As a result of this operation, the platen 90 is given an impression movement at a time when it is brought to a position directly over the positioned type of the totalizer elements 57.

Before the total key 108 may be operated, to cause a printing of the total, as explained, the upper lid 26, which normally conceals the key, must be elevated and an arm 109, the upper end of which normally stands in the path of a pin 110 carried by the printer frame, must be depressed to permit the necessary rocking of the frame. For effecting these combined functions the lock controlled lever 111 must be shifted into a total and reset position in which the segment 119 will have rotated the shaft 65 to the proper extent, to cause the cam plate 124 to rock the bell crank lever 126 counter-clockwise (Figs. 1 and 2). At this time a pin 1331, carried at the upper end of the upper arm 126 will serve to rock a plate secured to the cross shaft 127 sufficiently to disengage the hook of a lock arm 128 from a lug 131 and a hook 129 from a stud 133. Due to the disengagement of the stud 133, which is carried by the upper lid 26, the latter may be raised and, due to the disengagement of the lug 131, which is secured to the main casing of the machine, the front lid 27, which supports the shaft 127 and the pair of hooks, may be tilted forwardly. Rocking of the front lid 27 forwardly serves to carry the pin 1361, mounted in arm 136 secured to the lid, in the channel of a cam slot formed in the arm 138, so that the latter will be rocked counter-clockwise together with the shaft 563 and serve to lower the arm 109 so that its upper end will be withdrawn from the path of pin 110. At the same time an arm 139 is dropped to carry its rear end into the path of an arm 1400 secured to the key coupler, so that none of the operating keys may be depressed so long as the front lid is tilted forwardly.

For the purpose of protecting the totalizer elements against fraudulent manipulation by an unscrupulous employee, a guard 151 is mounted upon the printer frame and is so formed as to conceal the totalizer wheels and prevent the insertion of any form of implement, to engage and rotate the totalizer pinions. Since this guard is mounted upon the printing frame, it will be carried away from the totalizer wheels when the frame is rocked to effect a total printing operation. This is, of course, necessary in order to permit the printing from the elements of the totalizer and, at this time, the printing platen itself serves to conceal and protect the elements against tampering.

When the printer frame is in its normal position, for printing from the item wheels, it is possible to lift the platen and tilt it about its supporting shaft 89, for the purpose of permitting access to the record strip as well as the inking ribbon, when the latter requires some adjustment. All that is necessary to permit the lifting of the platen is to slide the clutch element 94 (Fig. 6) to the right, thereby disengaging the groove of the latter from a rib 951 formed on the side arm of the platen. In order that the lifting of the platen may be prevented at a time when it is in a position over the totalizer elements, at which time the guard or shield 151 will be out of its protecting position, a suitable interlock is provided. This interlock consists merely of a hook 156 extending from the upper edge of the platen actuating arm 93 and having a downwardly extending locking edge 157, which is normally in the path of a milled surface 158 (Figs. 2 and 6) formed in the intermediate supporting frame 562. When the clutch element 94 is in its normal position, as shown in Fig. 6, the printer frame may be carried forwardly without interference by the locking edge or finger 157, since the latter will then co-operate with the milled portion 158. However, if the clutch 94 should be shifted to the right (Fig. 6), to release the platen, and permit the latter to be lifted, the finger 157 will be carried into the plane of the high unmilled portion 159 of the intermediate frame and forward movement of the printer frame is accordingly prevented. So, also, if the printer has been shifted to carry the platen over the totalizer elements, the co-operation of the side of finger 157 with the side of the high portion 159 of the intermediate supporting frame will serve to prevent the sliding of the clutch 94 and hence prevent the lifting of the platen.

A resetting operation for restoring the elements of the totalizer to their zero positions is placed under the control of a lock 166, which is mounted upon the guard 151. Before the elements of the totalizer may be reset, it is necessary, first, to raise the lid 26 and then insert a special key, which is normally carried only by a proprietor or an auditor, into the barrel of the lock 166 and, finally, turn the latter by means of the key. At this time a cam 165, secured to the lower end of the lock barrel, serves to shift the totalizer shaft 58 longitudinally to line up the series of notches 162 cut in the shaft with the series of pawls 163 mounted on the several totalizer wheels. At the same time a pinion 161, secured to the shaft, and which is normally out of mesh with a resetting segment 160, is carried into mesh with the teeth of this segment. Upon drawing the lever 1601 forwardly the segment 160 will be rocked to rotate the totalizer shaft until the notches 162 have picked up all of the pawls 163 and carried the wheels to zero. In order to insure that a full stroke will always be given to the segment 160, a pair of pawls 172 and 176 are mounted upon the segment and co-operate with each other as well as with a fixed lug 174 and a portion of the dimes segment frame 46, to prevent the return of the segment after it has been given a slight initial forward movement and until it has been given its full forward movement.

Interlocking mechanism is also provided, for the purpose of preventing an operation of the operating keys, as well as of the total printing mechanism, during an operation of the resetting segment. This interlock consists of a member 182, loosely pivoted at its forward end to the segment and guided at its rear end upon a rod 183; as the segment is drawn forwardly a surface 185 of this member is carried over a flattened surface on a disc 181 secured to the main operating shaft 41, thus preventing the operation of any of the operating keys. At the same time a pin 192 carried by member 182 co-operates with a cam slot 191 in a plate 190, to carry a hooked shoulder 193 of the plate over the shaft 86 of the printer frame, thereby preventing the rocking of the latter to effect total printing. Obviously, the same connections serve to prevent the forward movement of the resetting segment whenever either the operating keys or the total printing mechanisms are displaced from normal. This interlock, in conjunction with the movements of the arms 109 and 139, under control of the lever 111, serves to prevent the simultaneous operation of any two of the three operating means, namely, the operating keys, the total printing key, and the resetting lever.

It is to be understood that while an example has been given of one use of the machine as disclosed it is not intended to limit its application to the line of business for which it has been described herein.

While the form of mechanism herein shown and described is admirably adapted to fulfill the objects primarily stated, it is to be understood that it is not intended to confine the invention to the one form of embodiment here shown since it may be embodied in various forms all coming within the scope of the claims which follow:

What is claimed is:

1. In a cash register, the combination with a printing totalizer comprising a plurality of totalizer elements, a movable printing frame movable over the totalizer elements for effecting printing impressions therefrom, a guard attached to the printer frame normally shielding the totalizer elements while said elements are not protected by said printing frame, and a cam carried by the guard for controlling the resetting of the totalizer when the printing frame is in its normal position.

2. In a cash register, the combination with a printing totalizer comprising a plurality of totalizer elements, a movable printing frame movable over the totalizer elements for effecting printing impressions therefrom, a guard attached to the printer frame normally shielding the totalizer elements while said elements are not protected by said printing frame, and a resetting device for the totalizer attached to the said guard and effective only when the printer frame is in normal position.

3. In a cash register, the combination with a totalizer comprising a plurality of totalizer elements, a guard adjacent said totalizer elements normally preventing improper manipulation of said elements, a resetting device under said guard for controlling the resetting of the totalizer, and a lock mounted on the guard for controlling the resetting device.

4. In a cash register, the combination with a totalizer comprising a plurality of printing elements, a guard for said totalizer for preventing the manipulation of said elements, a resetting device carried by the totalizer, a resetting segment co-operating with the resetting device normally ineffective for resetting the totalizer, and a lock mounted on the guard for rendering the resetting segment operable for resetting the totalizer.

5. In a cash register, the combination with a totalizer comprising a plurality of elements mounted on a shaft, resetting pawls carried by said elements, notches in said shaft normally out of co-operative relationship with said pawls, and a lock having connections to move the shaft to bring the pawls in co-acting relation with the notches in the shaft.

6. In a cash register, the combination with a totalizer comprising a plurality of elements mounted on a shaft, resetting pawls carried by said elements, notches in said shaft normally out of co-operative relationship with said pawls, a lock having connections to move the shaft to bring the pawls in co-acting relationship with the notches in the shaft, and a resetting lever for operating said shaft.

7. In a cash register, the combination with a plurality of elements mounted on a shaft, resetting pawls carried by said elements, notches in said shaft normally out of co-operative relationship with the pawls, a pinion attached to the shaft, a resetting segment adapted to co-operate with said pinion, but normally out of co-operative relationship with the pinion, and a lock having connections to move the shaft to bring the resetting pawls into co-acting relation with the notches and to simultaneously bring the pinions into mesh with the resetting segment.

8. In a cash register, the combination with a totalizer comprising a plurality of elements a shaft upon which the elements are mounted for resetting the totalizer elements, a lever for driving the shaft, but normally disconnected from the shaft, and key controlled means for connecting the shaft with said lever.

9. In a cash register, the combination with a totalizer comprising a plurality of elements mounted on a shaft, a pinion attached to the shaft adapted to reset the elements when rotated, a segment for driving the pinion, but normally disconnected therefrom, and a lock having connections to connect the segment with the pinion.

10. In a cash register, the combination with a printing totalizer, a liftable platen, a printer frame carrying the platen and movable to position it over the totalizer, and means for preventing the raising of the platen when the latter is positioned over the totalizer.

11. In a cash register, the combination with type wheels, a platen, a movable printer frame carrying the platen, means permitting the platen to be raised when the frame is in one position and means responsive to movement of said frame from said position for preventing raising of the platen until said frame is restored to said position.

12. In a cash register, the combination with a plurality of type wheels, a liftable platen, means for moving the platen downwardly to take printing impressions, a movable printer frame carrying the said platen and means for preventing movement of the printer frame when the platen is raised.

13. In a cash register, the combination with a plurality of type wheels, a liftable platen, means for moving the platen downwardly to take printing impressions, a movable printer frame carrying the said platen, means for preventing movement of the printer frame when the platen is raised and means for preventing raising of the platen when the printer frame is moved.

14. In a cash register, the combination with a plurality of type wheels, a platen, an operating mechanism, a clutch for connecting the platen to the operating mechanism; a movable printer frame carrying said platen, and means for preventing disconnection of the clutch when the printer frame has been displaced from its normal position.

15. In a cash register, the combination with a plurality of operating keys, a main operating mechanism operated by said keys, a totalizer, means for entering amounts in the totalizer, a manipulative device for printing totals directly from the totalizer, a resetting lever for the totalizer, and a lock controlled by said lever for locking the keys and the manipulative device while the lever is being operated.

16. In a machine of the class described, a series of operating keys, a lockable lid, a lever under said lid provided with a full stroke mechanism preventing complete restoration of the lever when shifted from normal, and interlocking mechanism between said keys and said lever whereby the operating keys may be locked against operation by partial movement of the lever.

17. In a machine of the class described, a totalizer, separate operating means for performing a plurality of functions upon said totalizer, a locking element directly connected to one of said operating means, and adapted when shifted to prevent operation of another of said operating means, and a second locking element controlled by said first locking element to prevent operation of a third of said operating means when the first mentioned operating means has been partially operated.

18. In a machine of the class described, a totalizer, separate operating means for accumulating items thereon, printing totals therefrom, and resetting said totalizer, said resetting means being normally ineffective, a locked casing normally preventing access to said total printing and resetting means but permitting operation of said item accumulating means, a normally locked control lever adapted to permit access to said total taking and resetting means and to prevent operation of said item accumulating means, and separate lock controlled means for rendering said resetting means effective.

19. In a machine of the class described, a totalizer, separate means associated therewith to accumulate items, print totals and to reset said totalizer, a record carrying frame, a pair of normally locked lids enclosing said total printing and resetting means and said record carrying frame, a lock for one of said lids adapted to permit access to said record carrying frame, a second lock controlling both lids to permit total printing and a third lock to control resetting of the totalizer after both said lids have been opened.

20. In a machine of the class described, a totalizer, a plurality of keys for operating said totalizer, manual means for causing a total to be printed from said totalizer, a manipulative device for resetting the totalizer, and mechanism co-operating with said keys, said manual means and said manipulative device to prevent the operation of more than one at a time.

21. In a machine of the class described, a totalizer, a guard normally covering said totalizer, manual means for controlling the taking of a total from said totalizer, connections under the control of said manual means for shifting said guard to uncover the totalizer, a member operated by said connections to cover said totalizer when it is uncovered by said guard, and means preventing shifting of said member to a position for exposing said totalizer.

22. In a machine of the class described, printing elements, an impression member cooperating therewith, a lever for operating said impression member, said lever being bodily movable in two directions, and means for preventing bodily movement of said lever in one direction when it is being given its other bodily movement.

23. In a machine of the class described, a pivoted impression element, an actuating member therefor adapted to be moved either longitudinally or transversely of its axis, and means for preventing transverse movement of said member when it has been moved longitudinally.

24. In a machine of the class described, impression taking means, a rockable member cooperating with said impression means to operate the latter, means for shifting said member on its axis, means for bodily shifting the axis of said member and interlocking connections between said two shifting means to prevent their simultaneous operation.

25. In a cash register, the combination with a printing totalizer comprising a plurality of totalizer elements, a movable printing frame for printing the total from said totalizer, a total printing manipulative device under control of a lock and key, a guard for the said totalizer movable with said printing frame, a resetting device for said totalizer normally concealed by said guard, and a lock attached to said guard and controllable by a key insertible from the exterior of said guard for governing said resetting device.

26. In a cash register, the combination of printing elements including type wheels and a movable printer frame, a platen carried by said frame and manually liftable to afford access to certain printing elements, and a lock to prevent such shifting of said platen after the printer frame has moved from normal position.

27. In a cash register, the combination of type wheels, a movable printer frame, a platen carried thereby and manually shiftable in a certain direction, means for moving the platen in another direction for taking printing impressions, and a lock to prevent manual shifting of the platen after the printer frame has been moved from normal position.

28. In a cash register, the combination of type wheels, a printer frame movable to take impressions from said wheels, a manually liftable platen carried by said frame, and means to prevent lifting of the platen when said frame is in position for taking said impressions.

29. In a cash register, the combination of a plurality of type wheels, a movable printer frame, a platen carried thereby and manually shiftable in a certain direction from its normal position therein, means for moving said platen in the opposite direction from normal position for taking printing impressions, and means for preventing movement of said frame when said platen is shifted in the first-mentioned direction from its normal position.

30. In a cash register, the combination of a plurality of type wheels, a movable printer frame, a platen carried thereby and manually shiftable in a certain direction from its normal position therein, means for moving said platen in the opposite direction from normal position for taking printing impressions, means for preventing movement of said frame when said platen is shifted in the first-mentioned direction from its normal position, and means for preventing shifting of the platen from normal position in the first-mentioned direction when the printer frame is moved.

31. In a cash register, the combination with a plurality of type wheels, a platen, an operating mechanism, a clutch for connecting the platen to the operating mechanism, a movable printer frame carrying said platen and said operating mechanism, and means for preventing disconnection of the clutch when the printer frame has been displaced from its normal position.

32. In a machine of the class described, a totalizer, means including a movable printer frame for taking a total from said totalizer, means carried by said frame for shielding said totalizer when said frame is in total printing position, and other means carried by said frame for shielding said totalizer when said frame is out of total printing position.

33. In a machine of the class described, a totalizer, a printer frame movable to a position for taking a total from said totalizer, a guard normally covering said totalizer and movable out of totalizer covering position upon movement of said frame to total taking position, and a member shiftable with respect to said frame for taking printing impressions and adapted to cover said totalizer when the latter is uncovered by said guard.

34. In a cash register, a totalizer, means for printing totals from said totalizer, means for resetting said totalizer, interlocking means normally permitting operation of either of said first-mentioned means, a bodily movable member carried by the resetting means for actuating said interlocking means to lock the total printing means against operation when said resetting means has been moved from normal position, and means carried by said total printing means adapted to engage said interlocking means when the former has been moved from normal position, thereby preventing movement of said resetting means.

35. In a cash register, the combination with a plurality of operating keys, a main operating mechanism actuated by said keys, a totalizer, means for taking printing impressions directly from said totalizer, means under control of the keys for entering amounts in the totalizer, a normally locked lid, a lever normally concealed by said lid for resetting the totalizer, and coacting means between the lever and the keys for locking one while the other is being operated.

36. In a machine of the class described, a totalizer, separate manually operable means for respectively printing totals from said totalizer and resetting the same, a normally locked lid for concealing said means, a cam plate operated by one of said means and cooperating with the other of said means to prevent simultaneous operation of both means, both of said means being normally released for operation, and means for releasing said lid.

In witness whereof I have signed my name this 15th day of Aug., 1924.

CHARLES W. GREEN.